July 15, 1941.  R. J. FINCH  2,249,467
SAFETY HOOK DEVICE FOR RAILWAY VEHICLE TRUCKS
Filed Nov. 12, 1940
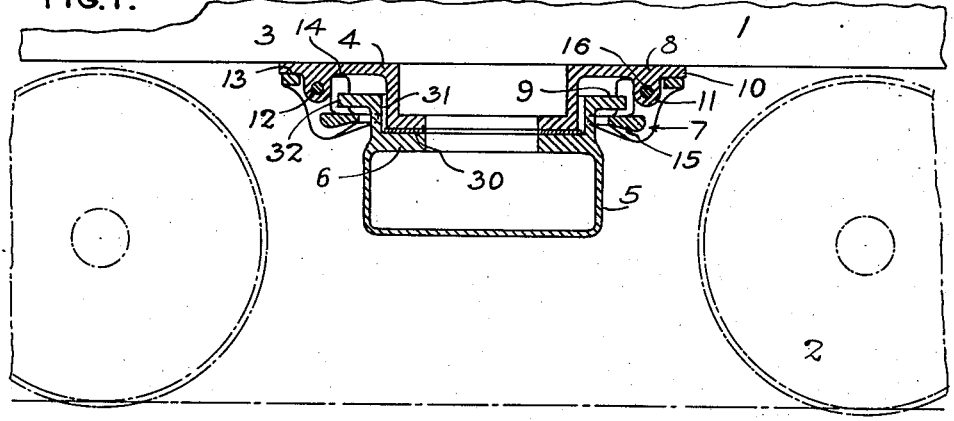
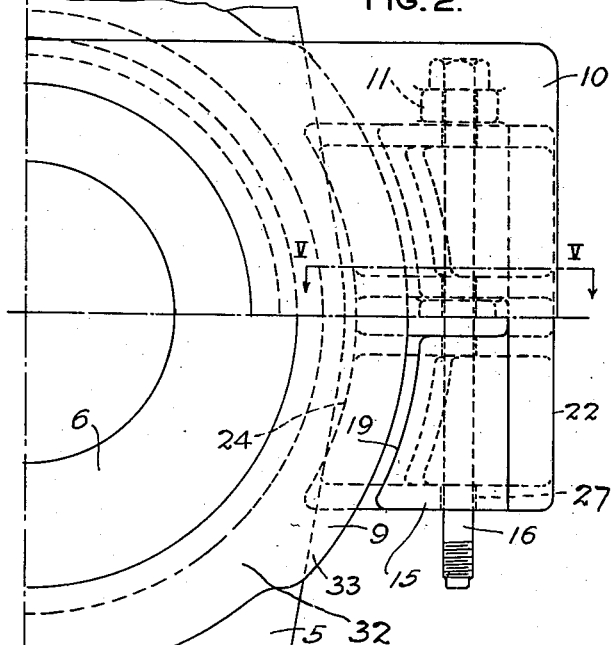
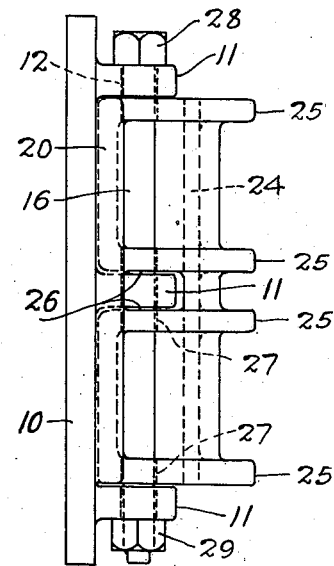
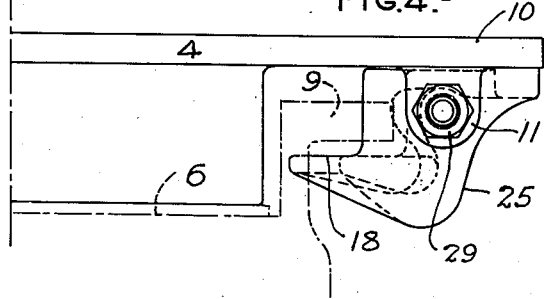
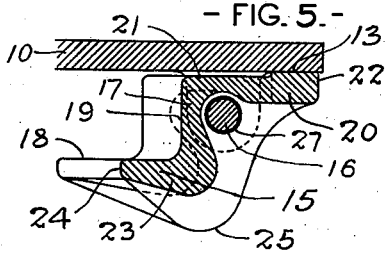
INVENTOR
Raymond J. Finch
By S. C. Yeaton
ATTORNEY Patented July 15, 1941

2,249,467

UNITED STATES PATENT OFFICE 2,249,467

SAFETY HOOK DEVICE FOR RAILWAY VEHICLE TRUCKS

Raymond J. Finch, Schenectady, N. Y., assignor to American Locomotive Company, New York, N. Y., a corporation of New York Application November 12, 1940, Serial No. 365,241

4 Claims. (Cl. 105—200)

This invention relates to railway vehicle truck safety hook devices.

It is a common practice to provide railway vehicle trucks with safety hook devices, usually applied at the center pin-plate structure, flexibly and removably securing the truck to the adjacent superstructure to prevent accidental separation of the truck and superstructure when the latter is lifted during construction or repair, and also during accidents such as derailment, at which time the truck, if not secured to the superstructure, will leave the superstructure and often cause the damage resulting from the accident to be increased.

There are various well-known types of safety hook devices. One type commonly used consists of a plurality of hook members bolted to the superstructure and a flange member secured to the truck, the members co-acting to prevent the above mentioned separation. The hook members are each secured to the superstructure by a plurality of vertical bolts. It has been found that, due to the small amount of available working space between the truck and superstructure at the center pin-plate structure, this method of securing the hook members to the superstructure is impractical, both from the standpoint of original manufacture and from the standpoint of the user who must from time to time separate the truck from the superstructure.

It is an object of the present invention to provide a simple type of safety hook device, for securing the truck and superstructure of a railway vehicle together, which does not have the disadvantages aforementioned.

A further object is to provide a safety hook device having a safety hook secured to the railway vehicle by a single horizontally disposed bolt.

Other and further objects of and advantages achieved by the present invention will be apparent from the following description of an approved embodiment thereof and the claims appended hereto.

Referring to the drawing forming a part of the present application, Figure 1 is a central section through a truck bolster, taken longitudinally of the vehicle, showing the center pin-plate structure and the safety hook device of the present invention, portions of the truck and superstructure being shown diagrammatically and partly in dot and dash lines; Fig. 2 is, at the upper half, a quarter plan view of the center pin-plate structure and safety hook device, and at the lower half, a quarter plan view of the center plate casting, safety hook and bolt, with the bolster shown fragmentally; Fig. 3 is an end view of the portion of the safety hook device carried by the superstructure, as viewed from the right of Fig. 2; Fig. 4 is a front elevation of the center pin-plate structure and safety hook device, as viewed from the front of Fig. 2, the center plate casting and portion of the safety hook device carried thereby being shown in dot and dash lines; and Fig. 5 is a section on the line V—V of Fig. 2 showing the portion of the safety hook device carried by the superstructure.

The railway vehicle embodying the present invention is shown diagrammatically fragmentally in Fig. 1, and is indicated generally by the reference numeral 1. It includes a truck 2, superstructure 3 connected thereto, center pin casting 4 secured to the superstructure (securing means not shown), bolster 5 forming part of the truck, center plate casting 6 formed integrally with the bolster, and safety hook device, indicated generally by the reference numeral 7, one being on each longitudinal side of the center pin-plate structure, each device being formed of a member 8 carried by the center pin casting and another member 9 carried by the center plate casting, parts of the device being cast with the center pin casting and center plate casting, as will presently appear.

The center pin-plate structure is of well-known construction except as modified in accordance with the present invention. The center pin casting includes an extension from each of its ends, each extension forming a part of the member 8.

Each member 8 includes a horizontal portion 10, formed by its respective extension, and three lugs 11, depending from the portion 10. The lugs are aligned transversely of the truck and have aligned orifices 12. Each portion 10 extends beyond the adjacent lugs to provide stop portions 13. Similar stop portions 14 are provided by each portion 10 on the inner side of the lugs. Each member 8 also includes a safety hook 15 secured to the lugs by a pin or bolt 16.

Each safety hook 15 has a body portion 17 and a horizontal flange or hook portion 18, both portions extending transversely of the truck. The body portion is spaced from the center pin and is formed of a vertical wall 19 of arcuate formation, being curved similar to the wall of the center pin, but of a larger radius, and a horizontal wall 20 extending from the top of and at right angles to the wall 19 in a direction away from the center pin. The horizontal wall 20 at its edge 21 adjacent the top of the wall 19 conforms to the circular shape thereof, and at its opposite edge 22 is straight, extending transversely of the truck. The hook portion 18 extends at right angles to the wall 19 in a direction toward but spaced from the center pin and is connected to the wall 19 at the bottom thereof. The hook portion at its edge 23 adjacent the bottom of the wall 19 conforms to the circular shape thereof, and at its opposite edge 24 adjacent the center pin is of circular formation similar to the wall of the center pin but of a radius larger than the radius of the wall of the center pin and smaller than the radius of the wall 19.

The safety hook further includes four webs 25, one outer web at each end thereof, and two spaced inner webs at the central portion. Each of the webs is connected at its top to the wall 20, at its inner side to the wall 19, and at its bottom to the hook portion 18, thereby reinforcing the entire safety hook 15. The two inner webs are spaced apart a distance substantially equal to the thickness of the center lug 11 and the wall 19 is cut away between the central webs providing an opening 26 in which the central lug 11 is disposed. The safety hook 15 is of a length equal to the distance between the outer lugs 11 and the safety hook is disposed between the outer lugs with its outer webs each adjacent the inner wall of an outer lug. Each of the webs has an orifice 27, the orifices 27 being in alignment with the orifices 12. Thus all of the orifices are in horizontal alignment in a direction transversely of the truck. The bolt 16 extends through these orifices being thereby similarly horizontally disposed, and serves to detachably secure the safety hook to the lugs 11. The bolt has a head 28 at one end and a nut 29 at the other preventing accidental displacement of the bolt. The wall 20 is in abutting relation with the stop portions 13 and 14 when the safety hook is secured to the lugs 11, preventing harmful swinging of the safety hook about the bolt 16.

The horizontal bolt 16 does the work of the three conventional vertical bolts, that is to say, as the bolt 16 passes through each of the three lugs 11 and through each of the webs, it provides three connections (acting as three separate bolts) between the safety hook and lugs, each connection taking its proportionate share of the weight carried by the safety hook when the truck is lifted by the superstructure or when operating in emergency.

The center plate structure consists of the usual horizontal plate 30 against which the center pin bears and the vertical wall 31 which encircles the center pin and prevents lateral relative displacing movement between the center pin and center plate. The member 9 of each safety hook device consists of a portion of a horizontal ring-shaped flange 32 which is formed integrally with the center plate, being connected to the top of the vertical wall 31. The flange 32 completely surrounds the vertical wall 31 and extends radially outward therefrom. It includes segmental extensions 33 at its portions forming part of the safety hook devices, each extension having its outer face concentric with and slightly spaced from the inner face of the vertical wall 19 adjacent thereto so that the truck may freely pivot about the axis of the center pin when in service. The extensions are for the purpose of providing additional flange surface adjacent the safety hooks. When the truck is assembled with the superstructure, and each of the safety hooks is secured to the lugs 11, the flange 32, at the segmental extension 33, is disposed between each of the flange or hook portions 18 and the adjacent horizontal portion 10 above and in overlapping coacting relation with the adjacent hook portion 18, thereby preventing disassemblage of the truck and superstructure as aforesaid.

Objections to the conventional type of safety hook device involving vertical securing bolts, regarding which the present invention is an improvement upon, are principally on account of the limited space available in a railway vehicle for the mechanic to operate in when applying or removing the vertical bolts, this work being overhead work and exceedingly difficult in the particular locality on account of cramped space, bearing in mind the relatively large number of bolts that must be provided; and further on account of the fact that these bolts, being vertical, when subjected to load are placed under tension and the load supported by their threaded connections.

In the present invention only two bolts or pins are employed which may, with convenience, be made of the required size and strength. These bolts being horizontally disposed when assembled, and requiring no threaded connection, are very easily slipped into place within the aligned orifices, the mechanic, when inserting the two horizontal bolts, operating or working from the side of the vehicle where there is ample room for this. These bolts are placed in shear when under load. Therefore the objections of the conventional bolts being placed under tension, and their threaded connections supporting the load are avoided.

Even if the devices of the present invention were placed at 90 degrees from their positions as shown (which variation is within the scope of the present invention), the bolts could be assembled with comparative ease. In fact three or more devices may be employed equally spaced circumferentially. However, ordinarily two devices diametrically opposed will suffice, these preferably being disposed transversely of the vehicle and each symmetrical at each side of the longitudinal center line of the vehicle as shown.

It should be further noted that it is within the scope of the invention to transpose the two members of each device so that the safety hook will be carried by the truck, in inverted position from that shown, and the other member will be carried by the superstructure. In either case the co-active part of the member carried by the truck will be above the coactive part of the member carried by the superstructure to provide for the locking of the truck to the superstructure.

While there has been hereinbefore described an approved embodiment of this invention, it will be understood that many and various changes and modifications in form, arrangement of parts and details of construction thereof may be made without departing from the spirit of the invention and that all such changes and modifications as fall within the scope of the appended claims are contemplated as part of this invention.

The invention claimed and desired to be secured by Letters Patent is:

1. A railway vehicle comprising a superstructure; a truck; a center pin-plate structure including a center pin element and a center plate element, one of said elements being carried by said superstructure and the other of said elements being carried by said truck; and devices spaced from each other circumferentially about said center pin-plate structure for holding said superstructure and truck together, preventing accidental separation thereof and permitting said truck to be carried by said superstructure when said superstructure is raised or lowered, each of said devices including two members, each provided with a horizontal flange, the flanges overlapping each other for coaction with each other, one of said members having a support secured to said superstructure, a body rigidly supporting its said flange, and a horizontally disposed pin extending through said body and said support detachably securing said body to said support, said body having a portion at each side of said pin engaging said superstructure to prevent rotation of said body about said pin, and the other of said members being secured to said truck, said body supported flange being directed toward said elements and the other of said flanges being directed away from said elements and being disposed above said body supported flange.

2. A railway vehicle comprising a superstructure; a truck; a center pin-plate structure including a center pin element and a center plate element, one of said elements being carried by said superstructure and the other of said elements being carried by said truck; and devices spaced from each other circumferentially about said center pin-plate structure for holding said superstructure and truck together, preventing accidental separation thereof and permitting said truck to be carried by said superstructure when said superstructure is raised or lowered, each of said devices including two members, each provided with a horizontal flange, the flanges overlapping each other for coaction with each other, one of said members having a support secured to said superstructure, a body rigidly supporting its said flange, said support including an orificed lug at each side of said body, and a horizontally disposed pin extending through said body and said lug orifices detachably securing said body to said support, said body having a portion at each side of said pin engaging said superstructure to prevent rotation of said body about said pin, and the other of said members being secured to said truck, said body supported flange being directed toward said elements and the other of said flanges being directed away from said elements and being disposed above said body supported flange.

3. A railway vehicle comprising a superstructure; a truck; a center pin-plate structure including a center pin element and a center plate element, one of said elements being secured to said superstructure and the other of said elements being secured to said truck; and devices spaced from each other circumferentially about said center pin-plate structure for holding said superstructure and truck together preventing accidental separation thereof and permitting said truck to be carried by said superstructure when said superstructure is raised or lowered, each of said devices including a plurality of spaced lugs depending from said superstructure, said lugs having aligned horizontal orifices, a member including a body having a portion adjacent each of said lugs, said portions having aligned horizontal orifices in alignment with said lug orifices, a flange secured to said body and extending therefrom toward said elements, a flange secured to said element secured to said truck and being disposed in overlapping relation with and above said flange secured to said body for coaction therewith during said holding, and a single horizontal removable pin inserted horizontally through all of said orifices, holding said member and lugs together.

4. A railway vehicle comprising a superstructure; a truck; a center pin-plate structure including a center pin element and a center plate element, one of said elements being carried by said superstructure and the other of said elements being carried by said truck; and devices spaced from each other circumferentially about said center pin-plate structure for holding said superstructure and truck together, preventing accidental separation thereof and permitting said truck to be carried by said superstructure when said superstructure is raised or lowered, each of said devices including two members, one of said members being secured to said truck and provided with a horizontal flange extending in a direction away from said center pin-plate structure, and the other of said members having a support rigidly secured to said superstructure and disposed exterior to said center pin-plate structure, a body, said support and body being provided with aligned orifices having a common horizontal axis disposed in a line entirely exterior to said center pin-plate structure, a horizontal pin disposed in said orifices pivotally connecting said body to said support, a flange rigidly secured to said body extending toward said center pin-plate structure and disposed beneath and in overlapping relation with said truck member flange for coaction therewith, and means preventing said body pivoting about said axis from body-flange coactive position in a direction away from said center pin-plate structure.

RAYMOND J. FINCH.